United States Patent
Gonsalves et al.

(10) Patent No.: US 9,378,030 B2
(45) Date of Patent: Jun. 28, 2016

(54) METHOD AND APPARATUS FOR INTERACTIVE MOBILE DEVICE GUIDANCE

(71) Applicant: AetherPal, Inc., South Plainfield, NJ (US)

(72) Inventors: Deepak Gonsalves, Bridgewater, NJ (US); Calvin Charles, Piscataway, NJ (US)

(73) Assignee: AetherPal, Inc., South Plainfield, NJ (US)

( * ) Notice: Subject to any disclaimer, the term of this patent is extended or adjusted under 35 U.S.C. 154(b) by 278 days.

(21) Appl. No.: 14/042,846

(22) Filed: Oct. 1, 2013

(65) Prior Publication Data

US 2015/0095773 A1    Apr. 2, 2015

(51) Int. Cl.
*G06F 3/0484*  (2013.01)
*G06F 9/44*    (2006.01)

(52) U.S. Cl.
CPC ............ *G06F 9/4446* (2013.01); *G06F 3/0484* (2013.01)

(58) Field of Classification Search
CPC ............................... G06F 9/4446; G06F 3/0484
See application file for complete search history.

(56) References Cited

U.S. PATENT DOCUMENTS

| 2008/0294981 | A1* | 11/2008 | Balzano | G06F 17/21 715/256 |
| 2010/0153515 | A1* | 6/2010 | Lau | G06F 8/34 709/217 |
| 2014/0173555 | A1* | 6/2014 | Ng | G06F 8/30 717/109 |
| 2014/0189507 | A1* | 7/2014 | Valente | G06F 3/04845 715/705 |

* cited by examiner

*Primary Examiner* — Andrea Leggett
(74) *Attorney, Agent, or Firm* — Volpe and Koenig, P.C.

(57) ABSTRACT

Described are a method and system that remotely instructs and guides end users of mobile devices to navigate through its various functions and configurations. The system comprises a repository, a control center, and an intelligent client on the mobile device, where the control center and mobile device operate in a client-server relationship and are in communication during a help session. An administrator uses the system to create step by step navigational instructions called story boards and reference device navigational maps which are uploaded to a repository. The control center pulls the relevant story boards and device navigation maps from the repository and uses it to remotely and interactively direct the end user of the mobile device to navigate through its various applications and functions.

20 Claims, 8 Drawing Sheets

METHOD AND APPARATUS FOR INTERACTIVE MOBILE DEVICE GUIDANCE

FIELD OF INVENTION

This application is related to mobile devices.

BACKGROUND

New mobile devices, (e.g. smartphones, tablets, and the like), are being released by original equipment manufacturers (OEMs) every week. Each OEM is competing to make its own devices stand out in the market. The mobile devices are being configured to support an increasing number of functions and a variety of applications. The result is that mobile devices are getting more and more complicated to use.

End users also feel the need to keep up with the current market trend and use the latest most advanced mobile device available in the market. Acquiring new mobile devices is made easy and economical with the subsidized mobile device upgrades provided by the network operators.

This is increasing the time spent trying to understand how to use the mobile device and all its functions. It is also increasing the time spent on calls with customer service representatives. Despite the large number of videos and mobile device tutorials available on the Internet, end users still desire an easier way to learn how to configure and use mobile devices effectively.

SUMMARY

Described herein is a method and system that has the capability to instruct and guide end users of mobile devices to navigate through its various functions and configurations. The interactive mobile device guidance system is comprised of a data repository, a control center, and an intelligent client on the mobile device. The control center and mobile device operate in a client-server relationship and are in constant communication during a help session. An administrator uses the virtual mobile management (VMM) system to create step by step navigational instructions called story boards and publishes it to the repository. In addition to the story boards, the VMM system also provides an environment within which, the administrator can use a reference device to retrieve the structural layout of the device and create reference device navigational maps, which are stored in the repository. The story boards are associated to the "nodes" on a navigation map. During an interactive session, the control center uses the device navigation map along with the story board as a template to control a client application.

A button or icon will be presented on the mobile device application for the purpose of engaging the system. An end user input or click can activate the button. A menu of the different areas on the mobile device is presented to the end user for purposes of selection. For example, such areas can be phone, camera, and email. A second user input selects the area of interest. This commences a secure connection between the mobile device and the control center. The control center retrieves all the relevant story boards metadata from the repository and displays it on the mobile device user interface. The end user is allowed to choose the story board of interest. The control center then commences communication with the device client and remotely assists the end user to navigate through the mobile device using device navigation maps and story boards as reference. This assistance could be a combination of audio messages, popup text messages, and highlighting parts of the mobile device screen that need user input. This is an intelligent interactive process. Input is provided by the end user in the form of a touch, key input, gesture, voice command and the like when instructed by the control center. The control center tracks the state of the mobile device and the position of the end user on the mobile device at all times. If the end user enters a wrong input or deviates from the instructions provided by the story board, the end user is allowed to rectify the action or request the control center to remotely execute the action.

DETAILED DESCRIPTION

It is to be understood that the figures and descriptions of embodiments have been simplified to illustrate elements that are relevant for a clear understanding, while eliminating, for the purpose of clarity, many other elements. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein.

Figure 1:
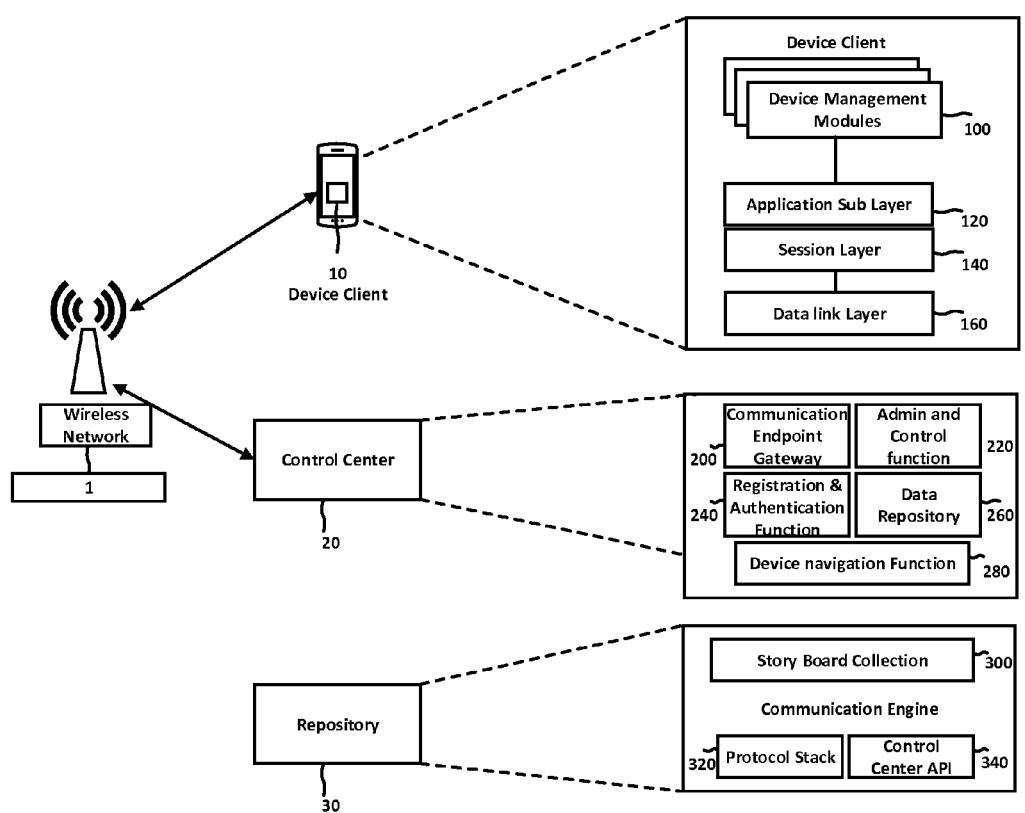
FIG. 1 shows an example architecture of an interactive mobile guidance system.

FIG. 1 is an example overall architecture of an interactive mobile device guidance system which comprises at least a device client 10 residing inside a device, a control center system 20 and a repository 30. The device 10 communicates with the control center 20 through a wireless network 1. For purposes of readability, block numbers starting with: 1xx relate to the device 10 and it components; 2xx relate to the control center system 20 and its components; and 3xx relate to the repository 30 and its components.

The control center system 20 is responsible for data management, device management, web services, analytics, security management, administrative services and device connectivity. The components of the control center system 20 includes a communication end point gateway (CEG) 200 (also referred to as a connection proctor), an admin and control function or entity 220, a registration and authentication function module or entity 240, a data repository 260 and a device navigation function module 280. The gateways, modules and/or entities are implemented as or in processors, servers and/or any computing device or system.

The CEG 200 manages the device connections within the system. In particular, the CEG 200 provides communication endpoints between the admin and control function module or entity 220 and the device 10, allows for multiple requests to be serviced within one session from multiple consoles, provides a consistent manner of device connection and tool service in a system with heterogeneous devices running different operating systems, provides load balancing across multiple connection handlers (as described herein below) on each CEG 200 in order to minimize single point of failure.

Figure 2:
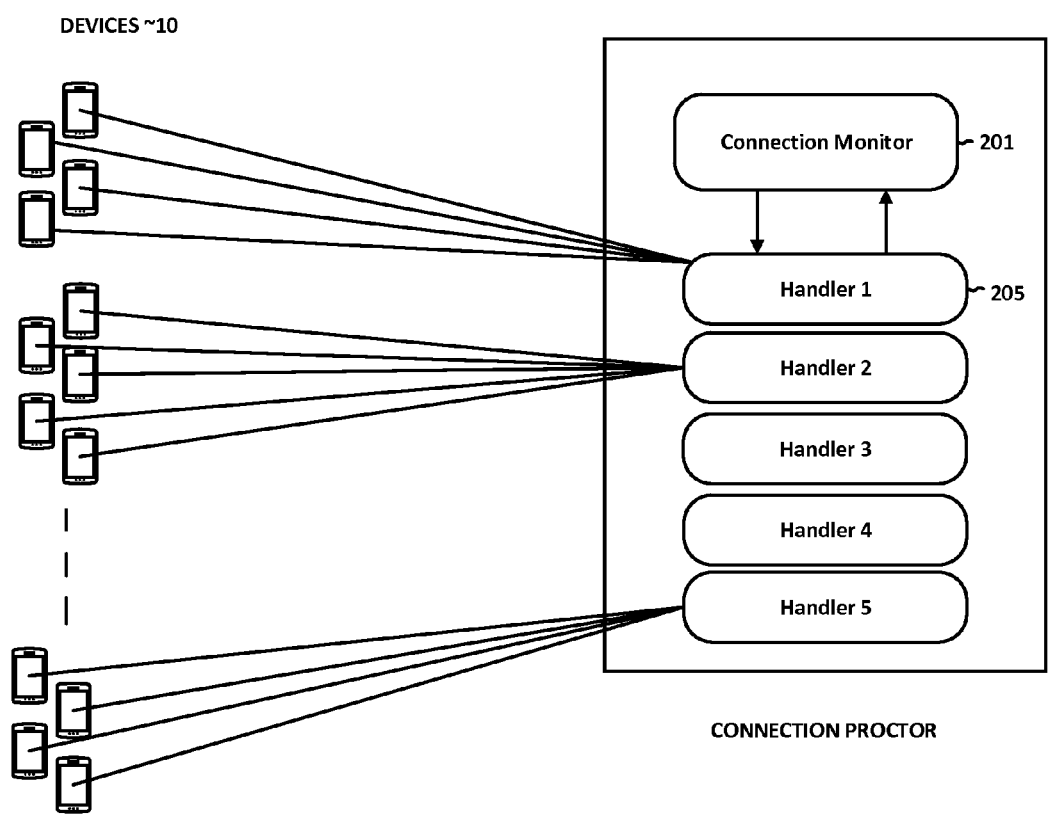
FIG. 2 shows an example of a connection end point gateway or connection proctor.

FIG. 2 shows an example CEG which includes at least a connection monitor 201 and connection handlers 205. The connection monitor 201 creates and manages connection handlers 205, creates session IDs for new connection requests and monitors all the scheduled and existing sessions. By default, a connection handler 205 is setup for every CEG, where the number of connection handlers 205 is configurable. All the sessions are load distributed across the connection handlers 205. Each connection handler 205 handles multiple device sessions.

Referring back to FIG. 1, the admin and control function or entity 220 administers and manages all types of communication between the control center 20 and the client devices. For example, the admin and control function or entity 220 may include an administrative service that acts as the central administration entity of the system. Through this service, system administrators perform administration, management and instrumentation of all the servers within the system, create and maintain multiple tenants, assign tenant administrator roles, and other like functions. In another example, the admin and control function or entity 220 may have a management service which provides the operational end point to the system and performs load distribution among the CEG, management of device registration, administration of devices and session queuing. A management entity may be included which is responsible for providing the management service with in-memory data storage for key operational data user/group/zone structures, and the like. In another example, the admin and control function or entity 220 may have a service coordinator which is responsible for coordinating the communication between various elements within the system. It provides the database interface to the registration and authentication function 240. All services register themselves with the service coordinator. The service coordinator is responsible for service discovery.

The data repository 260 stores all the information about the devices 10, server configuration, tasks and status settings. These databases (data repository 260) are pivotal to configure and update managed devices and server components. It is also responsible for maintaining the device authentication information. The data repository 260 may comprise three database (DB) elements: an admin DB, operations (Ops) DB, and a reports DB. The admin DB maintains all the system configurations, tenant configuration and management information, system administration and server instrumentation data. The admins DB is accessed by the administrative service. The Ops DB maintains data that is required for the operations of the system such as device enrollment, device information, user details and the like. The Ops DB is accessed by the management service and the service coordinator. The reports DB contain historical data of device enrollment, session, audit, report views, and the like.

The registration and authentication function 240 provides a single point of entry for all devices for enrollment and authentication services during a session. In an example, the registration and authentication function 240 comprises a registration service. In another example, the registration and authentication function 240 includes an enrollment service, which is responsible for enrolling registered devices with the system. In another example, the registration and authentication function 240 includes a software update module which manages the various client packages in the system. Devices connect to the software update module to request client updates. If an update is available, the software update module will provide the appropriate client download link. In another example, the registration and authentication function 240 includes an anchor admin which provides the administration component.

The device navigation function 280 provides an environment for retrieving comprehensive structural layout of a device to create device navigational maps. A set of commands might be executed on a reference device to map the position of all applications and functions within the device. The device navigational maps serve as a template to the control center when it is trying to navigate within the device. These device maps might also contain an integral tree structure of the device. These navigational maps of the device layout might be integrated with the story board templates and stored in the repository. The device navigation function 280 might also be responsible for processing the device information received during interactive navigation to retrieve the relevant story board content and device maps from the repository. In an another example, the device navigation function 280 might be responsible for delivering commands to the device client 10 for the purpose of enacting the story boards on the device. The device navigation module 280 might also receive constant status updates from the device client 10 which is used to determine the next set of commands that need to be delivered to the device.

The repository system 30 and its components are responsible for story board management which includes indexing and categorizing various story board contents. The repository system is also responsible for maintaining device navigational maps for mobile devices with various operating systems, software versions, make and model. The repository system 30 also has the responsibility of integrating appropriate story board content with the device navigational maps using various proprietary algorithms.

The device client 10, also referred to as the Virtual Mobile Management application or the VMM application herein, includes at least device management modules 100, application sub-layer 120, session layer 140, data link layer 160.

Figure 3:
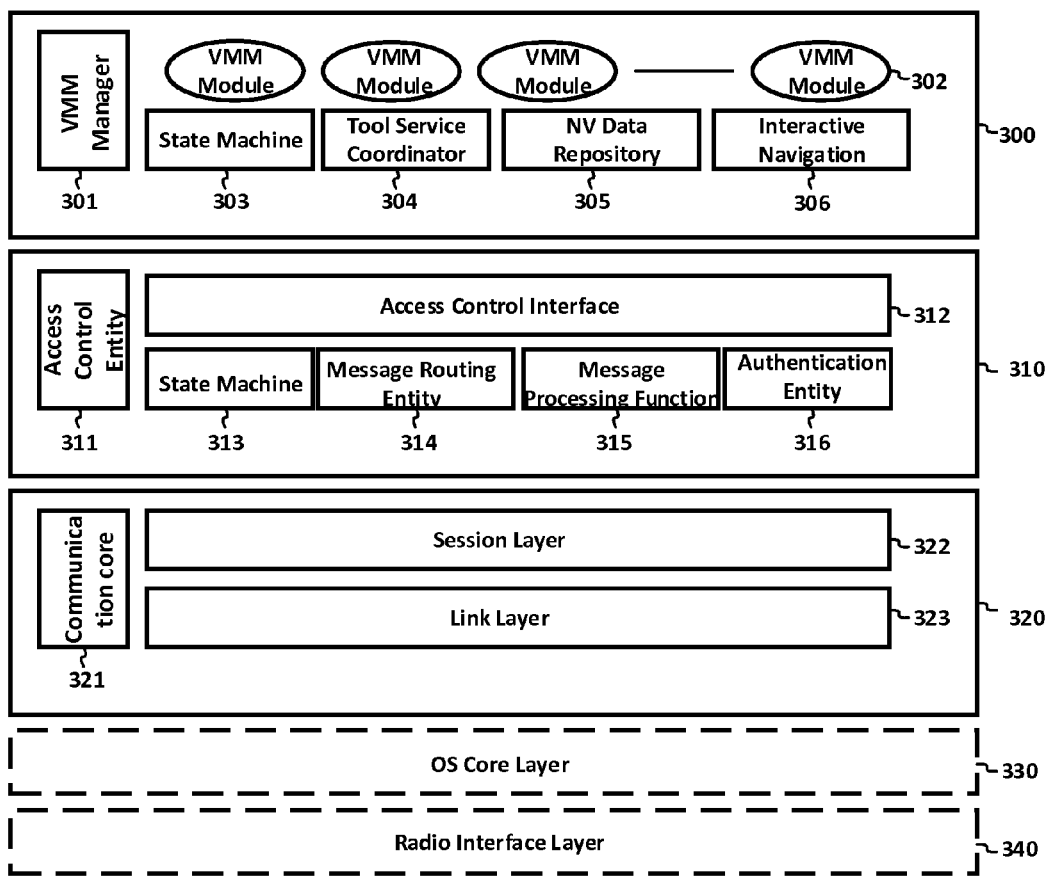
FIG. 3 shows an example device client architecture.

Referring to FIG. 3, the VMM application 10 includes a virtual mobile management (VMM) layer or entity 300, an access control entity 310 and communication core 320. The VMM entity 300 includes a VMM manager 301, VMM modules 302, a state machine 303, a tool service coordinator 304, a non-volatile data repository 305 and interactive navigation module 306.

The VMM modules 302 provide a multitude of tool services. The tool services are grouped together to exhibit common functionality such as remote control, remote navigational guidance and the like. Each tool service maintains an instance of a state machine 303, which defines a set of shared states that the tool service on the device application shares with the control center 20. The tool service coordinator 304 maintains a collection of active tool service instances that are currently being serviced by the entire VMM application 10. The tool service coordinator 304 maintains the lifetime of all tool services, and is responsible in creating and destroying tool services.

The non-volatile data repository 305 stores authentication and authorization specific data that is shared between the VMM application 10 and the control center 20. The non-volatile data repository 305 also serves the purpose of maintaining tool service configuration as well as VMM configuration data.

The interactive navigation module 306 provides the function of guiding the end user of the device 10 through the various story boards. The interactive navigation module 306 might receive commands or instructions from the control center 20 over the air and executes it on the device 10. Examples of such commands might include but is not limited to simple clicks on specific coordinates of the device, gestures or swipes, location specific applications on the device, highlighting sections of the device screen that need user input, providing visual or audio instructions to the end user of the device 10 and providing corrective actions when user errors occur. The interactive navigation module 306 is in constant communication with the control center 20 and is also responsible for reporting the state of the device 10 and user input back to the control center 20.

The access control entity 311 provides a set of functions to the tool services to communicate with the control center 20. The access control entity 311 provides encapsulation of messages before forwarding it to the communication core layer 320. It invokes an instance of the communication core layer 320 and provides a state machine 313 that defines the state of the VMM application 10.

The access control entity 311 interacts with an access control interface (ACI) 312, which provides a set of standard Application Programmer Interfaces (API) to the tool services. These APIs provide a consistent communication platform to facilitate both synchronous as well as asynchronous communication. The state machine 313 identifies the overall state of the VMM application 10. State transitions within the state machine 313 triggers events that are handled by the VMM layer 300. The states are open and close and traffic flows through the ACI 312 only in the open state.

An authentication entity 316 is responsible for ensuring that the device 10 receives a connection and processes requests from the control center 20 with which it is enrolled. The authentication entity 316 ensures data integrity, security and authentication.

A message routing entity 314 is responsible for routing all signal messages destined to tool services to the respective event handlers.

A message processing function 314 is a signal message pre-processor and receives signal messages from the session layer 322 destined towards tool services. The message processing entity de-frames these messages prior to forwarding it to the message routing entity, which applies the routing rules. Messages that are destined to the control center from tool services are encapsulated in the message processing entity.

The communication core layer 320 setups and maintains a dedicated communication channel with the control center 20. The communication core layer 320 provides the necessary framework to transport messages between the upper layers 300 and 310 and the control center 20. The communication core layer 320 provides message encapsulation, framing, fragmentation and packet re-construction of tool service messages.

Described herein is a method using the system described herein above which provides users of mobile devices with a simple, interactive and intelligent way to learn how to navigate through mobile devices and configure then without having to search the Internet or make a call to customer service. Based on the type of mobile device and its capabilities, the user is presented with a choice of navigational tutorials or story boards. Choosing a story board automatically starts a remote connection with the control center which then interactively helps the user navigate through the device. The story boards can be updated to reflect changes in the device features and functions as a result of software updates. No operator or customer service interaction is needed to interactively guide the user through the device with respect to an area of interest.

For purposes of illustration, the interactive navigation system operates in a client-server model. However, other operating models can be used. The model consists of a client application on the device which communicates with the control center over the air. The control center assists the user to navigate through the device by executing various commands as depicted in story board content.

Figure 4:
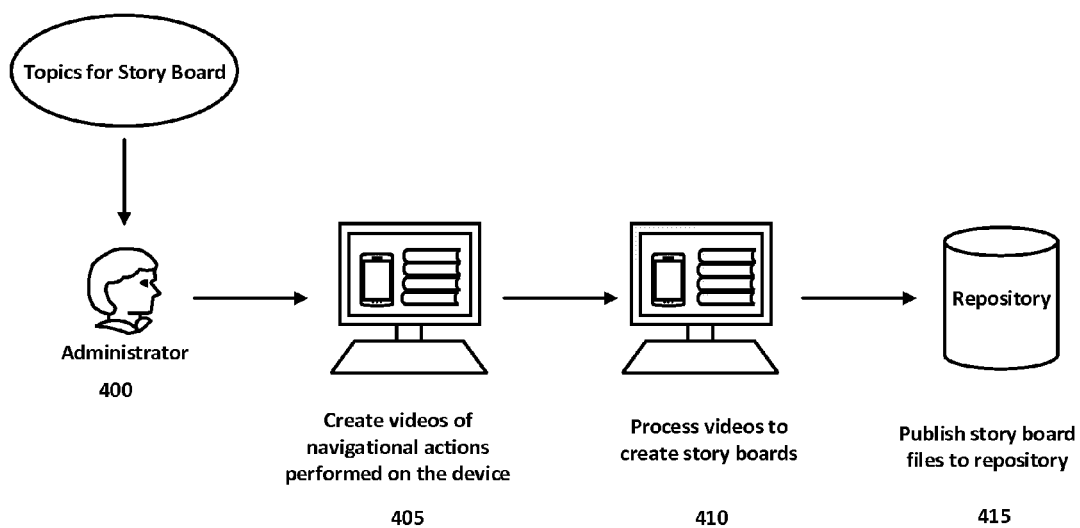
FIG. 4 shows an example story board creation process by an administrator.

FIG. 4 describes the process of story board creation. In an example method, an administrator 400 creates content for the story board based on frequently asked questions from mobile device users. In an example method, the administrator might use the assistance of customer care representatives who are in constant communication with the mobile device users.

The administrator 400 can remotely connect to a mobile device using a virtual mobile management (VMM) system. A video of navigational actions performed on the device is recorded by the administrator using the video tool available in the VMM (405).

A story board with step by step navigational instructions is then composed by the administrator 400 using the recorded videos (410). In an example, the story board might contain audio/visual instructions. The story board is then published in a repository for future reference (415). For example, the story board might be uploaded to a story board repository. This might be a database or another server which manages story boards. The story board is indexed and categorized for easy access. The control center has access to the repository and can retrieve the story board content when needed. The administrator 400 might also run a process on a reference device to retrieve a comprehensive layout of the device for future reference. This layout is converted into device map templates. These template maps contain location information about every node or endpoint on the device. It also contains navigational paths to every application and function on the device. The device map templates might be integrated with the story board content.

Figure 5:
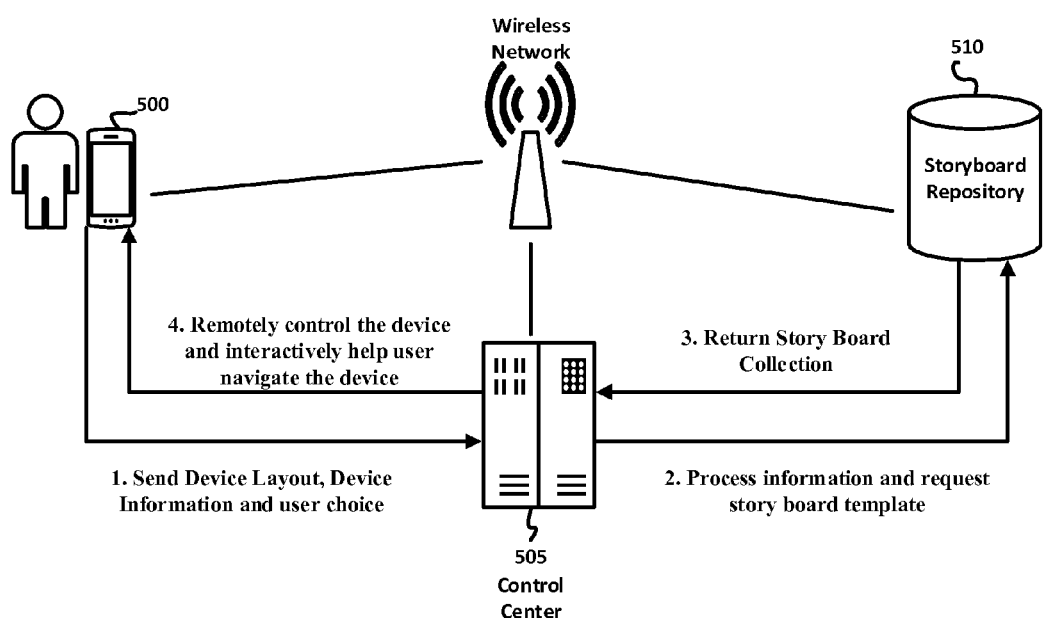
FIG. 5 shows an example backend process which occurs after an end user requests for help or assistance.

FIG. 5 describes the process which takes place in the backend when the user of a device 500 clicks on the Help button. In general, a client embedded in the device 500 contacts a control center 505 and has a secure communication channel open for information transfer. The device client transmits the device details to the control center 505 (1). The control center 505 uses this information to request the story board template and device navigation map from a repository 510 (2). The repository 510 returns the device navigation map with storyboard collection embedded back to the control center 505 (3). Using a combination of story board content and the device navigation map as reference, the control center 505 remotely monitors the mobile device 500 and interactively guides the end user through device navigation. The position of end user within the device 500 is constantly evaluated against the reference device navigation maps.

Figure 6:
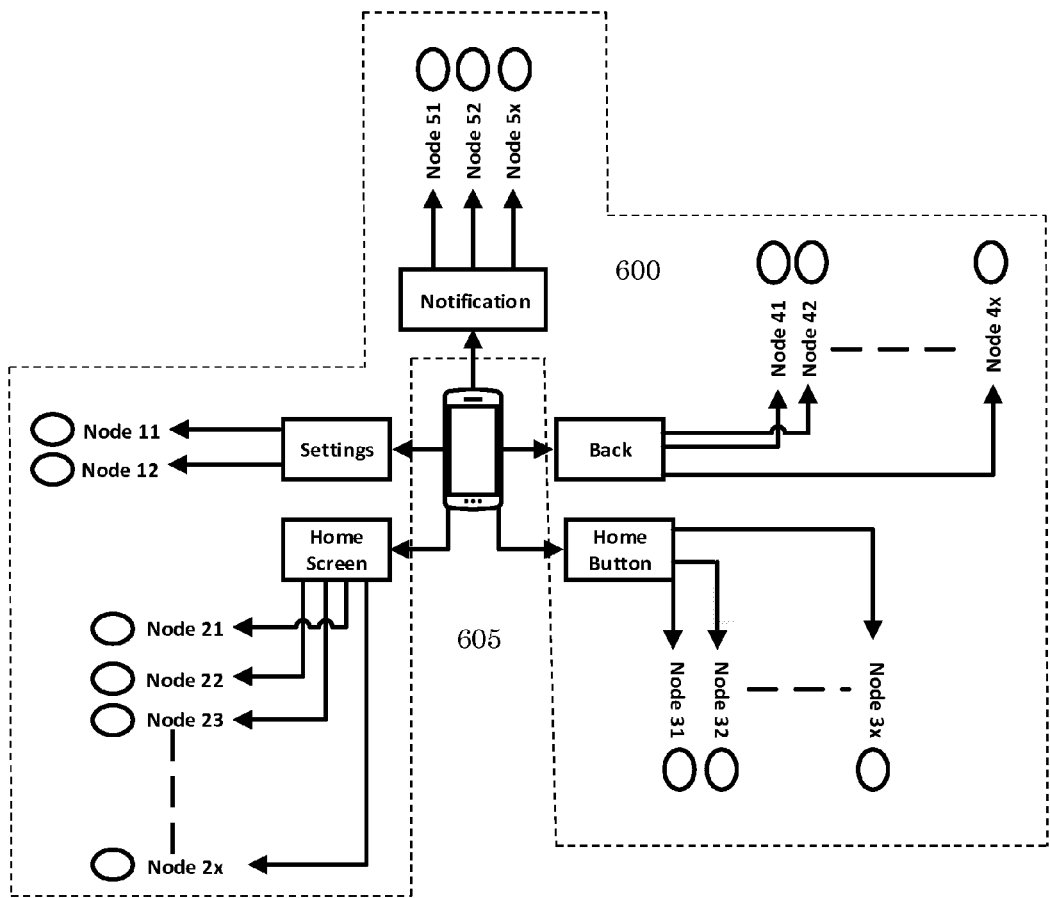
FIG. 6 shows an example device navigational map with storyboards associated with each node/endpoint.

FIG. 6 shows an example of a device navigation map 600 with story board content embedded to its nodes or endpoints. This map might contain information about the location of all applications and functions within a device 605.

Figure 7:
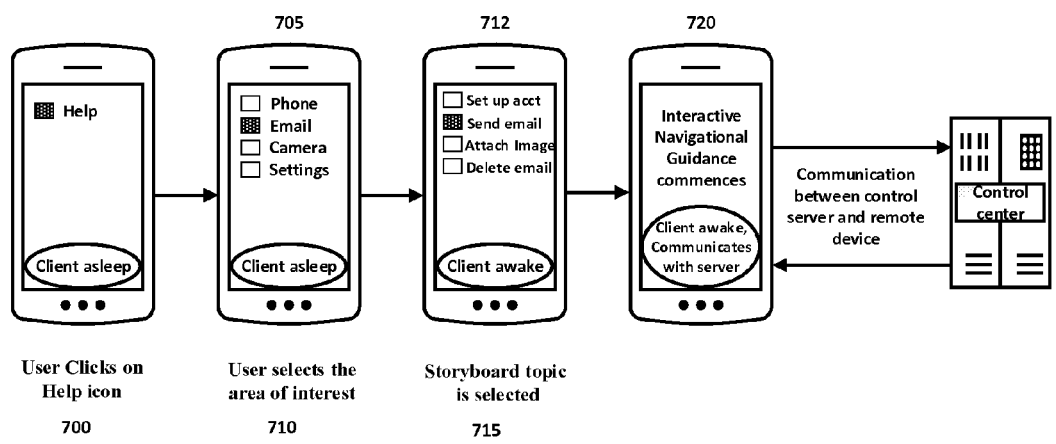
FIG. 7 illustrates an example of what an end user interface looks like during the interactive guidance process.

FIG. 7 shows an example of what happens on the end user interface during the interactive navigational guidance process. A user clicks on the Help button or icon (700). This opens a page with a list of available areas the user can get help on (705). This list is a dynamic list which is constantly updated by the administrators of the system. The user clicks on email as the area of interest (710). The client on the device starts a secure connection with the control center (720). If the client was not previously enrolled with the control center, then an enrollment process takes place. Authentication information is exchanged between the device and server. The device client provides all basic device information to the control center and saved therein.

Once the device is enrolled with the server, the device client sends the area of interest to the server. In this instance, the device client sends "email". The control center sends this area of interest along with the device details to the story board repository. The storyboard repository returns all the related story boards to the control center along with the device navigation maps. As described herein above, the storyboard collection is a dynamic collection which is constantly updated by the administrator.

For a specific area of interest, there may be a set of story boards. For purposes of illustration, in the email area of interest, the following story boards maybe available: 1) sending an email; 2) switching between accounts; 3) including an attachment; 4) emailing to a group; 5) forwarding an email; 6) setting up corporate email; and 7) setting up personal email. The above is displayed on the device user interface as a popup text or spoken as an audio message (712).

For this illustration, "Sending an email" is chosen (715). The control center might request the user to navigate to the device home screen. The home button maybe highlighted or pointed to. On the home screen, it is determined if the email application is visible. If available and/or visible, the user is asked to click on it using audio or text instructions. The icon might also be highlighted. If email is not available or visible on the home screen, a command is sent to the device client to navigate to different screens on the device where the email application will be searched for. If the application is not found on the device, the control center might provide the user with alternate ways to execute the storyboard.

Once the user clicks on the correct icon, the control center moves forward with the storyboard. Inside the email application, the "New Email" button might be highlighted or emphasized in some manner. The user can click on it or allow the control center to execute it remotely. Inside the new email page, the control center guides the user to compose the mail step by step by highlighting each field that needs user input and instructing the user to enter the correct values. Once the process is complete, user can exit from the storyboard and end the device connection or choose another story board or area to go through.

Figure 8:
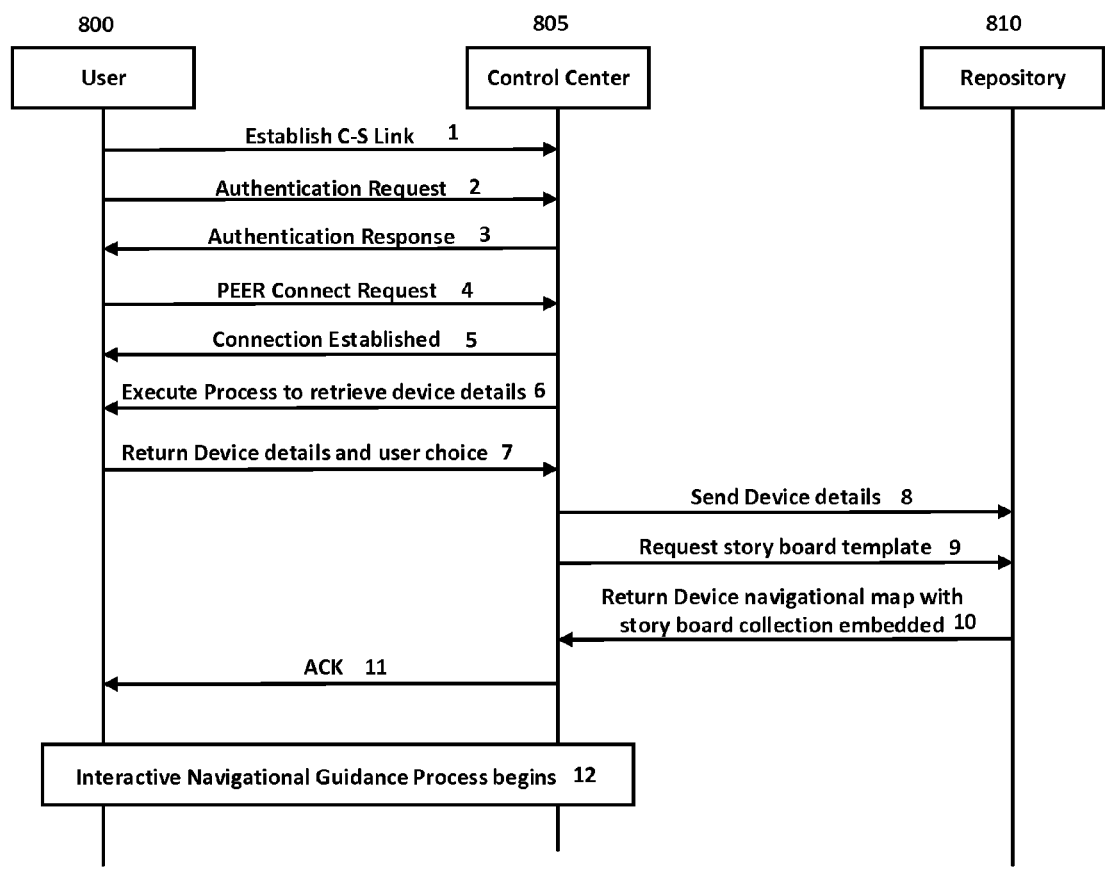
FIG. 8 shows an example flow of control during an interactive mobile device guidance.

FIG. 8 shows an example flowchart for interactive navigational guidance between a user/device 800, a control center 805 and a story board repository 810. The user/device establishes a client-server link with control center 805 (1). The user/device 800 and control center 805 undergo an authentication request (2), authentication response (3) and peer connection request (4) to establish a secure data connection (5). The control center 805 sends commands to the device client in user/device 800 to retrieve device details (6). The user/device 800 returns the device details and user choice to control center 805 (7). The control center 805 analyses this data and sends the device details to the repository 810 (8). Story Board template is then requested (9). The story board repository 810 returns the device navigation map with story board collection embedded within (10). Once control center 805 has all the information it needs, it sends an acknowledgement to the device/user 800 (11). The interactive navigational guidance process commences (12).

While detailed embodiments of the instant invention are disclosed herein, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the technology to variously employ the present invention in virtually any appropriately detailed structure.

Although features and elements are described above in particular combinations, each feature or element can be used alone without the other features and elements or in various combinations with or without other features and elements.

What is claimed is:

1. A method for helping a user use a mobile device, comprising:
   receiving mobile device information and an area of interest from the mobile device, wherein the area of interest is application, functional and configuration information related to using the mobile device;
   receiving at least one story board associated with the mobile device information and the area of interest from a repository;
   receiving at least one device navigational map from the repository, the at least one device navigational map is at least one structural layout of the mobile device;
   displaying at least the at least one story board on the mobile device;
   remotely controlling the mobile device to execute the at least one story board; and
   interactively navigating the user through the mobile device via the combination of the at least one story board with respect to the area of interest and the at least one device navigational map.

2. The method of claim 1, further comprising:
   receiving progress reports from the mobile device as the user performs actions associated with the at least one story board.

3. The method of claim 2, further comprising:
   providing the user with corrective actions based on position of the user in the mobile device as the user is executing the at least one story board.

4. The method of claim 3, wherein the corrective actions include auto-correcting an incorrect action.

5. The method of claim 1, further comprising:
   tracking a position of the user in the mobile device using the at least one device navigational map as reference while the user executes the at least one story board.

6. The method of claim 1, wherein at least one of audio prompts, popup texts and highlighting user input areas are used to interactively navigate the user through the mobile device.

7. The method of claim 1, further comprising:
   recording videos of navigational actions performed with respect to a plurality of areas of interest for different mobile devices;
   processing the videos to generate a plurality of story boards for each of the different mobile devices;
   storing the plurality of story boards for each of the different mobile devices in the repository;
   providing an environment within which structural layouts of the different mobile devices can be retrieved to create mobile device navigational maps of the different mobile devices; and
   storing the mobile device navigational maps for the different mobile devices in the repository.

8. The method of claim 7, further comprising:
   updating the plurality of story boards for each of the different mobile devices.

9. A method for helping a user use a mobile device, comprising:
   presenting a user interface at the mobile device to the user for selecting an area of interest with respect to the mobile device, wherein the area of interest is application, functional and configuration information related to using the mobile device;

transmitting device information and the area of interest to a server;
engaging in a remote control session with the server to use at least one story board associated with the device information and the area of interest, wherein the at least one story board was provided by a repository;
displaying the at least one story board on the mobile device; and
interactively navigating through the mobile device via device navigation maps and the at least one story board with respect to the area of interest, wherein device navigation maps are at least one structural layout of the mobile device.

10. The method of claim 9, further comprising:
transmitting progress reports from the mobile device as the user performs actions associated with the at least one story board.

11. The method of claim 10, further comprising:
receiving corrective actions based on a position of the user in the mobile device as the user is executing the story board.

12. The method of claim 11, wherein the corrective actions include auto-correcting an incorrect action.

13. The method of claim 9, wherein at least one of audio prompts, popup texts and highlighting user input areas are used to interactively navigate the user through the mobile device.

14. A system, comprising:
a repository configured to store and index a collection of story boards with respect to different mobile devices and multiple areas of interest, wherein an area of interest is application, functional and configuration information related to using a mobile device;
a server configured to communicate with the different mobile devices and the repository;
the server configured to receive device information and area of interest from at least one of the mobile devices;
the server configured to receive at least one story board associated with the device information and the area of interest from a repository;
the server configured to remotely control the at least one mobile device to execute the at least one story board by at least causing the at least one story board to be displayed on the mobile device; and
the server configured to interactively navigate the user through the at least one mobile device via the at least one story board with respect to the area of interest.

15. The system of claim 14, further comprising:
the server configured to receive progress reports from the at least one mobile device as the user performs actions associated with the at least one story board.

16. The system of claim 15, further comprising:
the server configured to provide the user with corrective actions based on a position of the user in the at least one mobile device as the user is executing the story board.

17. The system of claim 16, wherein the corrective actions include auto-correcting an incorrect action by using a device navigation map as reference.

18. The system of claim 14, wherein at least one of audio prompts, popup texts and highlighting user input areas are used to interactively navigate the user through the mobile device.

19. The system of claim 14, further comprising:
the repository configured to store device navigation maps for different mobile devices;
the server configured to receive recorded videos of navigational actions performed with respect to a plurality of areas of interest for the different mobile devices;
the server configured to process the videos to generate a plurality of story boards for each of the different mobile devices;
the server configured to store the plurality of story boards for each of the different mobile devices in the repository;
the server configured to receive at least one device navigation map for a mobile device in the repository, wherein the at least one device navigational map is at least one structural layout of the mobile device; and
the server configured to associate each story board with a respective node of the at least one device navigation map.

20. The system of claim 19, further comprising:
the server configured to update the plurality of story boards for each of the different mobile devices; and
the server configured to update the device navigation maps for each of the different mobile devices.

* * * * *